Patented July 6, 1937

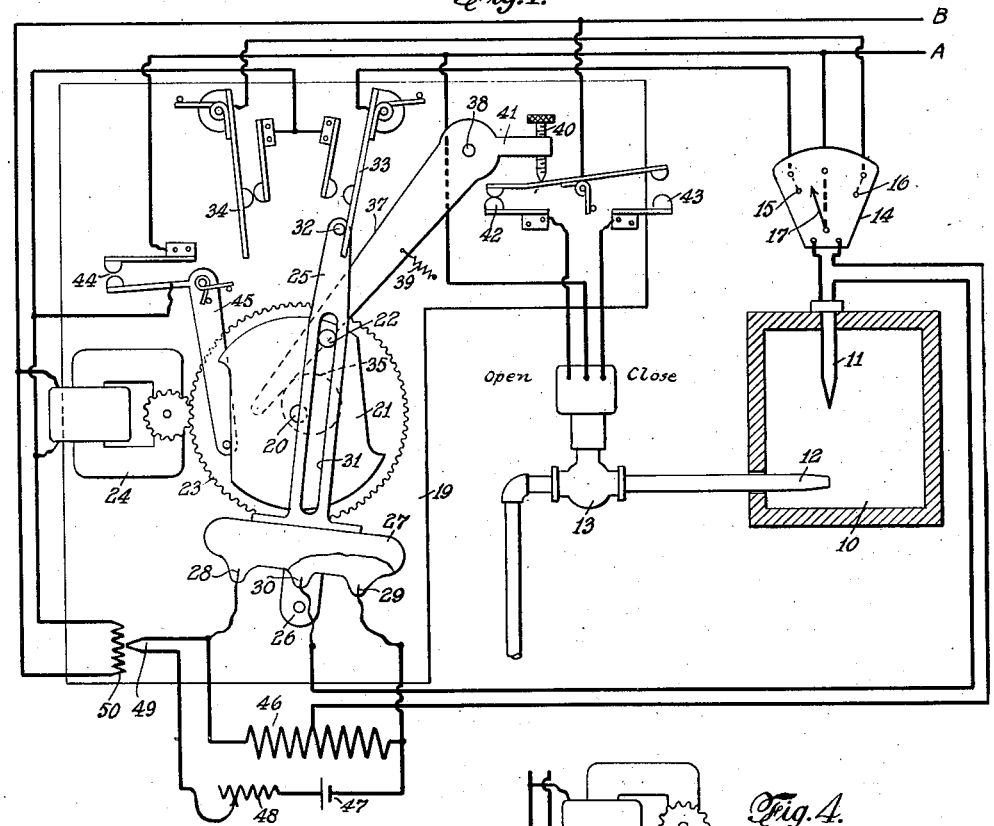

2,085,856

UNITED STATES PATENT OFFICE 2,085,856

AUTOMATIC CONTROL SYSTEM

Ozro H. Hunt, Waterbury, and Charles W. Petitjean, Naugatuck, Conn., assignors to The Bristol Company, Waterbury, Conn., a corporation of Connecticut Application December 27, 1934, Serial No. 759,332

14 Claims. (Cl. 236—69)

The invention relates to automatic control systems, and more particularly to so-called "anticipators" for use in connection with the same, which anticipators embody means auxiliary to the basic control of a variable magnitude and tending to anticipate the trend or variation of such controlled magnitude and to introduce influences to compensate for the same, so that "overshooting" and consequent "hunting" of the controlled magnitude are eliminated or at least minimized. In the copending application for U. S. Letters Patent, Serial #691,638, of Ozro H. Hunt, there is set forth a control device embodying certain of said "anticipatory" features, these being there incorporated in the device in a most elementary form. Since the introduction of an anticipatory characteristic in a control system consists essentially in providing means to nullify "overshooting" of the control, it follows that the intensity of operation should be modified in accordance with the tendency to overshoot, which is greatest when the controlled magnitude tends to deviate most widely from the control point, and approaches a minimum as the optimum condition is neared.

It is an object of this invention to provide means whereby the intensity of action of such an "anticipatory" device is thus modified in accordance with the deviation of the controlled magnitude from the optimum value.

A further object is to provide means for preventing malfunctioning of the apparatus in the event of sudden changes in the controlled magnitude.

Still another object resides in the provision of an improved mechanical embodiment of the device.

In carrying out the invention, a means such, for example, as a motor-controlled valve, is provided for controlling the magnitude of a variable in response to changes in the same; and additional means modifying the performance of the said control means in response to the phase or direction of said changes. Furthermore, provision is made to affect the intensity of action of said modifying means in response to the activity or order of magnitude of said controlling means. As a specific embodiment, a controlling pyrometer regulates the operation of the valve through a measuring and control circuit including a temperature-sensitive element governing the supply of an electric current to said circuit; and there are associated with said circuit two sources of E. M. F.—one substantially constant to anticipate the change, and the other maintained at a value dependent upon the activity of the pyrometer controller. Switching means serve to introduce the combined E. M. F.'s into the controller circuit with a polarity dependent upon the direction or phase of the variation in the magnitude under control.

The nature of the invention, however, will best be understood when described in connection with the accompanying drawing, in which:

Fig. 1 is a diagrammatic representation of the novel system, and as embodied specifically in a temperature control system, as one example of a system to which the invention is applicable.

Fig. 2 is a detail view, in side elevation viewed at an angle of 45°, of a part of the mechanism utilized in the novel system.

Fig. 3 shows an alternative arrangement of a portion of the circuit forming a part of the system; and Fig. 4 shows a still further alternative arrangement of this portion of the circuit.

Referring to the drawing, more especially Fig. 1, 10 designates a casing affording a chamber or space in which it is desired to maintain a constant temperature, as measured and controlled by a thermocouple 11, through the regulation of the supply of a heating agent such as steam or a combustible fuel admitted to a nozzle 12 discharging into the said chamber; and which supply is under the direct control of an electrically controlled valve 13.

A pyrometer-controller 14, which may be any one of a variety of well-known types, preferably such as set forth in U. S. Letters Patent #1,979,330, is provided with a "low" contact 15 and a "high" contact 16 which may be alternatively actuated or closed through a pointer 17 operated by the instrument movement. This movement is included in circuit with the thermocouple 11, and thereby made responsive to the temperature prevailing in the space 10—all of which is well known and forms no particular part of the present invention.

In accordance with the invention, provision is made to introduce into the pyrometer-controller circuit an E. M. F. additional to that developed by the thermocouple 11 and in a sense to simulate the effect of an exaggeration of the change in temperature which will ultimately be brought about due to the movement of the valve 13, and thus afford an "anticipatory" action. Moreover, through the application of a further and opposing E. M. F. to the said circuit, a modification of the magnitude of the aforesaid introduced E. M. F. is effected and in a manner such as to be proportional to the activity of the pyrometer-controller 14.

To this end, there is rotatably carried by a base-plate 19 a shaft 20 upon which is mounted a two-lobed cam 21, which bears also a crank-pin 22, and has attached a gear 23 whereby the cam may be rotated through action of a motor 24. A rocker-arm 25, pivoted about a mounting 26 on the base-plate 19, carries a mercury switch 27, of the single-pole double-throw type, having contacts 28 and 29 which may be alternatively connected to a common contact 30 in accordance with the position of the rocker-arm. Through a longitudinal slot 31 in the rocker-arm 25 extends the said crank-pin 22, so that as the latter is revolved about the axis of rotation of the shaft 20 the said rocker arm will oscillate about the mounting 26, throwing the mercury switch 27 from one to the other of its extreme positions.

The end of the rocker-arm 25 remote from the mounting 26 carries a pin 32 adapted to engage either of two limit switches 33 and 34, these being normally held closed by springs and free to swing, after opening, to the limits of travel of the said arm 25.

An eccentric cam 35 is carried upon the shaft 20 and is adjustably retained thereon, as by a set screw 36. This cam is adapted for engagement with a lever arm 37 swinging about a pivot 38, being held into engagement with the eccentric 35 by a spring 39. Through an adjustable screw 40, the arm 41 of this lever engages operatively a double-throw switch (preferably of the type set forth in U. S. Letters Patent #1,960,020) and having contacts 42 and 43, alternatively actuated in accordance with the position of arm 37 in its engagement with the eccentric 35.

A further switch embodying contacts 44 is actuated by a follower arm 45, spring-urged into operative engagement with the contour of the two-lobed cam 21, in a sense that when in engagement with the maximum radius of the cam, the switch contacts are closed, and, when engaging the minimum radius, they are opened.

Between the contacts 28 and 29 of the mercury switch 27 is connected a resistor 46, tapped at its mid-point; and between this point and the contact 30 of the mercury switch is connected a loop including the thermocouple 11 and the pyrometer controller movement in series. Across the contacts 28, 29 of the resistor 46 is connected a circuit containing in series a battery or other constant source of E. M. F. 47, an adjustable rheostat 48 and a thermocouple 49, the latter being thermally associated with a heating resistance 50 and so connected that as the temperature of the couple rises its thermoelectromotive force tends to oppose that of the battery 47.

The connections of the control circuit are as follows: One side A of a supply circuit is connected to the common terminal of the controller 14; and from the contacts 15 and 16 conductors pass directly to the limit switches 33 and 34 respectively; while, from a point common to these switches, a conductor connects to one terminal of the motor 24, the remaining terminal being connected to the other side B of the supply. An alternatively circuit from the common point of the limit switches to the side A of the circuit is provided through the switch 44. The heater 50 is connected directly across the terminals of the motor 24.

The common terminal of the switch embodying contacts 42, 43 is connected to the side B of the supply, the circuit being completed through the said contacts to the "open" and "close" terminals respectively of the motor valve 13; and from the common terminal of the motor connection is made to the "A" side of the line, providing a valve opening and closing circuit of the conventional type.

Fig. 3 shows a thermocouple 51 and a heater 52, similar to couple 49 and heater 50 described above, the couple serving as a source of voltage alternative to the battery 47. When thus installed in the mercury switch circuit, the heater is maintained at all times at a constant temperature by being connected across the supply circuit A—B.

The relative positioning and adjustment of the several switches will be understood from the following description of the cycle of events in the operation of the device:

Assuming for a condition of reference that the valve 13 is open, which admits a heating agent into the chamber 10 and causes the temperature therein, as measured by the thermocouple 11, to rise. All parts of the mechanism on the base-plate 19 will be resting substantially in the position shown in Fig. 1, the contacts of the several switches being as indicated.

The motor 24 being at rest, the heater 50 will not be energized, so that the couple 49 will be at room temperature. Current from the battery 47 will flow unopposed through the resistance 46, the polarity of the battery being so arranged that, with contact 29 of the mercury switch closed, as shown in the drawing, there will be introduced into the circuit of the thermocouple 11 and the controller movement an electromotive force tending to augment that of the couple and to cause the pointer 17 in the controller 14 to indicate a higher value than the true temperature. The switch of the controller will, therefore, be prematurely tripped, contact 15 being opened and contact 16 simultaneously closed, prior to the time of the actual temperature in the chamber 10 reaching the value for which the controller is set.

Closing of the contact 16 serves to energize the motor 24 through the limit switch contacts 34, whereupon the cam member 21 and associated elements of the mechanism will begin to rotate in a clockwise sense. Immediately after the commencement of this rotation, the lever arm 37, following the eccentric 35, will act to throw over the switch to open contact 42 and at the same time close contact 43 and energize the "closing" circuit of the valve 13. This valve will immediately run to its closed position, and there be brought to rest through the action of self-contained limit switches (not shown).

At the same time, through the action of the crank-pin 22 in the slot 31, the arm 25 carrying the mercury switch 27 will be rocked toward the right, as shown in the drawing, the contact 29 of the mercury switch, which was closed under the initial condition, remaining so as the switch is swung further in that direction. The contacts 33 of the limit switch, which were open under the initial condition, will be opened wider, but will produce no effect, as the running current of the motor 24 is being carried by the contacts 34.

This action will continue until the crank-pin 22 has revolved through an angle of substantially 180° from its starting position, when, after closing the contacts 33, the pin 32 will act to open the contacts 34 and bring the motor 24 to rest with the rocker arm and mercury switch in such a position that the contact 29 is disconnected and the contact 28 connected to the terminal 30.

The action of the throwing over of the mercury switch is to introduce into the main pyrometer circuit, without changing the total resistance of the same, the voltage derived from the battery 47, but in a reversed sense relative to its original direction.

Thus, whereas this voltage originally tended to increase the reading of the pyrometer, it will now tend to decrease the reading below the true value, thereby anticipating a lowering of temperature and tending to cause the controller to act earlier than if the battery voltage were not applied.

Upon the controller 14 closing the "low" contact 15, current will pass to the motor 24 through the limit switch contact 33 and again initiating rotation of the shaft 20 and associated parts, whereupon the switch will immediately be thrown to close contacts 42 for opening of the valve 13, and the heating agent again admitted to the chamber 10. The crank-pin 22 will continue its rotation as set forth above, this time swinging the rocker arm first to the left and then back through the central position to the position shown in the drawing, where, by opening of the limit switch 33 the mechanism will again be brought to rest.

Thus, with the voltage from the battery introduced into the pyrometer circuit—always in a sense to simulate the effect of an exaggeration of the change in temperature which will ultimately be brought about due to the movement of the valve 13, but only after a lapse of time due to the interval required for the rocker arm to swing away from its position of rest and back again beyond its mid-position—there is obtained an "anticipatory" action substantially equivalent to that set forth in the above-mentioned application, Serial #691,638.

The switch contacts 44 are actuated, through the arm 45 from the two-lobed cam 21, in such a manner that these contacts will be closed slightly after the cam begins its rotation in either of the half-cycles above set forth, and will remain closed until after the pin 32 has closed one or the other of the limit switches 33 and 34. The purpose of this contact is to provide means whereby the motor 24 may be kept in motion in the event of the controller 14 for any cause, after having initiated action of the device, acts to reverse the position of its contacts prior to the cam mechanism having completed its half-revolution. In such a case, the contact 44, by bridging the controller and limit switch contacts, renders the motor temporarily independent of these contacts and prevents the mechanism coming to rest in an intermediate position, with the possibility of disturbing the normal cycle of events.

The magnitude of the potential derived from the battery 47 and applied to the resistor 46, and hence of the electromotive force introduced into the pyrometer circuit, is subject to modification both by manual adjustment of the rheostat 48 and automatically by the opposing effect of the thermocouple 49 as heated by the resistor 50. As this resistor is connected in parallel with the motor 24, the amount of heat produced therein, and hence the voltage developed by the couple 49, will be proportioned to the activity of the motor; and the more frequently the motor is called upon to go through its cycle, the greater will be the average value of the voltage opposed to that of the battery 47, and hence the less the net anticipatory effect superimposed upon the pyrometer controller.

Thus, when a condition of equilibrium is approximately maintained and the temperature adheres closely to the control point with a minimum of "overshooting" and therefore a minimum of corrective effort only is required on the part of the compensating device, the contacts 15 and 16 of the controller 14 will be relatively active; and the resulting frequency of operation of the motor 24 will be reflected in a lowering of the net voltage available in the compensating circuit, with a consequent minimizing of the "anticipatory" action. If, on the other hand, temperatures tend to vary widely, or "overshoot" so that the controller remains at either extreme of its travel for relatively long periods of time, the activity of the motor will be reduced; and, the opposing effect of the couple 49 in the battery circuit being at a minimum, the net voltage in this circuit is increased; and the "anticipatory" effect, which is the direct opposite of "overshooting", becomes a maximum.

In Fig. 4 is shown an alternative method of modifying the intensity of the compensating action, embodying the principle of the Callendar bridge. A bridge network 53 includes three arms 54, 55 and 56 electrically formed of conducting material having a negligible temperature coefficient of resistivity, such as manganin, and a fourth arm 57 which is formed of electrically conductive material having an appreciable temperature coefficient (such as copper or nickel). The arm 57 is made up as a network having four (preferably equal) branches of a common material. These arms are physically juxtaposed in order that they may operate at a common temperature; and they are so adjusted that, while the total resistance of the arm 57 may vary with temperature, the network constituting that arm will remain in itself a permanently balanced bridge circuit.

Two opposite junctions of the bridge network 53 are connected to the terminals of the resistor 46' and these to the contacts 28' and 29' of the mercury switch 27'. The remaining two opposite junctions of the network 53 are connected, through a manually adjustable resistor 58, to a source of E. M. F. 59, which may be a voltaic cell (as in Fig. 1), a constantly heated thermocouple (as in Fig. 3) or a rectifier (not shown) operating from an a-c. supply. The four-armed balanced network constituting the arm 57 is connected at two of its opposite junctions into the bridge circuit 53, and at its remaining two opposite junctions to the terminals of the motor 24, or, they may be connected to a source of current supply (not shown) which is energized concurrently with said motor.

The network 57 being at all times balanced, application of electromotive force to its outside supply circuit will not produce an E. M. F. across those terminals which are connected into the bridge circuit 53, so that current from the outside supply, whether it be alternating or direct, will not flow in the network 53 or produce any direct disturbance of potential therein. For the same reason, current flowing in the bridge network 53 and producing a potential difference across the terminals of the arm 57 which are connected into the bridge will not produce a potential difference across the other two terminals of the network 57, so that the resistance of the outside circuit, or any changes which may take place in that resistance, will not affect the condition of balance or unbalance of the bridge network 53.

However, upon the motor 24 being energized, current will flow in the network 57, and because of the resistance of that circuit will tend to raise its temperature, with the result that the resistance of that arm of the bridge 53 will be changed, with a consequent effect upon the balance of the bridge. In practice, the bridge 53 is adjusted to a condition of normal unbalance, so that an electromotive force derived from the source 59 will produce a difference of potential between the terminals which are connected to the resistor 46'. This potential difference will be introduced into the circuit of the thermocouple and the pyrometer controller by action of the mercury switch 27' in the manner hereinabove set forth; and, without energization of the network 57 from an outside source, compensation will be effected exactly as above described. The proportioning and adjustment of the bridge network 53 is such that upon the network which constitutes the arm 57 being energized concurrently with the motor 24', the consequent change of resistance of that arm will tend to balance the bridge network 53, thus reducing the available potential applied to the terminals of the resistor 46', and thus thereby reducing the compensating effect so introduced into the pyrometer circuit as the switch 27' varies its positions.

To those versed in the art it will be apparent that so long as the heater unit energized concurrently with the motor 24' is in intimate thermal association with the thermally-sensitive arm of the bridge circuit 53, it is not necessary that there be electrical interconnection between the control circuit and the pyrometer circuit. For instance, there could be utilized in place of the arm 57 a unit of the form set forth in Fig. 1 of U. S. Patent #1,457,851 to Nesbit, with the production of equivalent results.

We claim:

1. In a device of the class described: a pyrometer including a control instrument, an actuating thermocouple, and a connecting circuit, said control instrument tending to modify the temperature to which said couple is exposed in a sense to minimize the departure of its thermoelectric force from a predetermined value; means for introducing into said circuit an E. M. F. tending to augment changes in the thermoelectric force due to said modification; together with means for modifying the intensity of the introduced E. M. F. in response to the frequency of operation of said control instrument.

2. In a device of the class described: a pyrometer including a control instrument, an actuating thermocouple, and a connecting circuit, said control instrument tending to modify the temperature to which said couple is exposed in a sense to minimize the departure of its thermoelectric force from a predetermined value; means for introducing into said circuit an E. M. F. tending to augment changes in the thermoelectric force due to said modification; together with means for modifying the intensity of the introduced E. M. F. in inverse proportion to the frequency of operation of said control instrument.

3. In a device of the class described: a pyrometer including a control instrument, an actuating thermocouple, and a connecting circuit; a source of constant E. M. F.; switching means for introducing the E. M. F. into said circuit with either of two polarities; motor means for actuating said switching means and including limit switches to define normal positions of repose for said switching means; and contacts to bridge said limit switches except when said switching means occupy the said normal positions of repose.

4. In a device of the class described: a pyrometer including a control instrument, an actuating thermocouple, and a connecting circuit; a source of constant E. M. F.; switching means for introducing the E. M. F. into said circuit with either of two polarities; motor means for actuating said switching means and including limit switches to define normal positions of repose for said switching means; contacts to bridge said limit switches except when said switching means occupy the said normal positions of repose; and means for modifying the intensity of the introduced E. M. F. in inverse proportion to the activity of said control instrument.

5. Temperature control means comprising a pyrometer for controlling the magnitude of temperature changes, said pyrometer including a control instrument, an actuating thermocouple sensitive to changes in the temperature to be controlled, and a connecting circuit; two thermojunctions connected in opposed relationship in said circuit; means for maintaining one of said junctions at a substantially constant temperature; and means for maintaining the other of said thermojunctions at a temperature governed by the activity of said control instrument.

6. Temperature control means comprising a pyrometer for controlling the magnitude of temperature changes, said pyrometer including a control instrument, an actuating thermocouple sensitive to changes in the temperature to be controlled, and a connecting circuit; two thermojunctions connected in opposed relationship in said circuit; and temperature-actuated means for regulating the net E. M. F. available from said thermojunction in inverse proportion to the activity of said control instrument.

7. Temperature control means comprising a pyrometer for controlling the magnitude of temperature changes, said pyrometer including a control instrument, an actuating thermocouple sensitive to changes in the temperature to be controlled, and a connecting circuit; electrically actuated means subject to the trend of the temperature changes for regulating the supply of an agent for controlling said temperature changes; a pair of thermojunctions adapted to be connected in opposed relationship in the said circuit; means for maintaining one of said junctions at a substantially constant E. M. F., and means for maintaining the other of said junctions at an E. M. F. dependent upon the activity of said control instrument; together with switching means for introducing the combined E. M. F.'s of said junctions into said circuit with a polarity dependent upon the direction of actuation of said regulating means.

8. Temperature control means comprising a pyrometer for controlling the magnitude of temperature changes, said pyrometer including a control instrument, an actuating thermocouple sensitive to changes in the temperature to be controlled, and a connecting circuit; electrically actuated means subject to the trend of the temperature changes for regulating the supply of an agent for controlling said temperature changes; a pair of thermojunctions adapted to be connected in opposed relationship in the said circuit; means for maintaining one of said junctions at a substantially constant E. M. F., and means for maintaining the other of said junctions at an E. M. F. dependent upon the activity of said control instrument; together with switching means for introducing the combined E. M. F.'s of said junctions into said circuit with a polarity dependent upon the direction of actuation of said regulating means; and additional means to reduce the intensity of the introduced E. M. F. as the activity of said regulating means becomes greater.

9. Temperature control means comprising a pyrometer for controlling the magnitude of temperature changes, said pyrometer including a control instrument, an actuating thermocouple sensitive to changes in the temperature to be controlled, and a connecting circuit; a normally unbalanced bridge circuit including in one arm a permanently balanced bridge circuit of material having an appreciable resistance-temperature characteristic, a source of constant E. M. F. for said first-named bridge circuit, means for applying to said second-named bridge circuit an E. M. F. representative of the actuation of said regulating means, whereby the temperature of said second-named bridge will be raised and the total resistance changed, tending to balance said first-named bridge; together with switching means for including said first-named bridge circuit in said connecting circuit with a polarity dependent upon the direction of actuation of said regulating means.

10. Temperature control means comprising a pyrometer for controlling the magnitude of temperature changes, said pyrometer including a control instrument, an actuating thermocouple sensitive to changes in the temperature to be controlled, and a connecting circuit; a normally unbalanced bridge circuit including in one arm a temperature-sensitive resistance; means for varying the temperature of said resistance in accordance with the activity of said regulating means, thereby changing its resistance in a sense to balance said bridge circuit; together with a source of substantially constant E. M. F. for said bridge circuit; and switching means for including said bridge circuit in said connecting circuit with a polarity dependent upon the direction of actuation of said regulating means.

11. Temperature control means comprising a pyrometer for controlling the magnitude of temperature changes, said pyrometer including a control instrument, an actuating thermocouple sensitive to changes in the temperature to be controlled, and a connecting circuit; means for regulating the supply of an agent for controlling said temperature changes and subject to operation by said control instrument; two interconnected and opposed sources of E. M. F., one of substantially constant value; means for maintaining the other at a lesser value and of a magnitude dependent upon the activity of said electrically actuated means; together with means for introducing the combined E. M. F.'s of said opposed sources into said measuring circuit and with a polarity such that the substantially constant component of the combined E. M. F.'s tends to augment the change in current in said measuring circuit due to change in temperature of said temperature-sensitive element as a result of the pyrometer-controlled regulation of said temperature-controlling agent.

12. In a device of the class described: an instrument responsive to changes in a magnitude, control means commanded thereby for effecting control of said magnitude in an alternative sense according to its variation above or below an optimum value, mechanically actuated means for modifying the performance of said control means in response to the trend of said changes, and means actuated concurrently with said mechanically actuated means for affecting the intensity of action of said modifying means in accordance with the frequency of operation of said control means.

13. In a device of the class described: an instrument responsive to changes in a magnitude, control means commanded thereby for effecting control of said magnitude in an alternative sense according to its variation above or below an optimum value, mechanically actuated means for modifying the performance of said control means in response to the trend of said changes, and means actuated concurrently with said mechanically actuated means for affecting the intensity of action of said modifying means in accordance with the number of the controlled magnitude transitions through the optimum value.

14. Temperature controlling means comprising a pyrometer for controlling the magnitude of temperature changes, said pyrometer including a control instrument, an actuating thermocouple sensitive to changes in the temperature to be controlled, and a connecting circuit; a control circuit, a rotary member, an electric motor for driving said rotary member and energized through said control circuit from said pyrometer, a switch actuated by said rotary member and including a set of contacts, and means governed by the switch to command the flow of a temperature-affecting agent; a second set of contacts adapted to be included in the connecting circuit for modifying the action of said pyrometer, and an oscillating member for delayed actuation of the said second set of contacts; and means to provide adjustment in the relative time of operation of said switch contacts and said second set of contacts, together with a third set of contacts also actuated by said oscillating member and included in said control circuit for modifying the intensity of said first-named modifying action, and having a substantially fixed time relationship relative to said modifying action.

OZRO H. HUNT.
CHARLES W. PETITJEAN.